United States Patent Office 3,298,276
Patented Jan. 17, 1967

3,298,276
FILM PRINTING DEVICE FOR
REDUCTION PRINTING
Harald Bender, Avon, Conn., assignor to Oxberry Corporation, Mamaroneck, N.Y., a corporation of New York
Filed Sept. 14, 1964, Ser. No. 396,297
Claims priority, application Switzerland, Sept. 16, 1963, 11,408
6 Claims. (Cl. 88—24)

There are many cases where it is desirable to make prints from 35 mm. standard motion picture film on 16 mm. motion picture film. The reduction necessary in such cases is dictated by the respective dimensions of the frames of these films, which are—

35 mm. film: 16 mm. x 21 mm.
16 mm. film: 7.62 mm. x 10 mm.

Thus the reduction factor is:

$$16/7.62 = 2.1$$

There exist optical printers which print 35 mm. film on 16 mm. film by reducing the frame size optically. Devices of this type may consist of a supply reel, a take-up reel, a film channel with film aperture of suitable dimension for each film size, a printing lens of suitable dimension, a light source and a shutter. Individual frames of the 35 mm. film are projected into the 16 mm. aperture by the printing lens, reducing the frame size by a ratio of 2.1 to 1. Both films are moved frame-by-frame. During the "stand still" period of the films the shutter is opened thus exposing one full frame of the 16 mm. positive film. The drawback of this well-known printing device is that both films have to be moved step-by-step, this means that the film movements are complicated and must be very precise.

The present invention provides a printer which uses principles of continuously running printers in which both films move with constant speed through the film channel thus yielding a higher printing speed than the step-by-step motion.

A difficulty in producing such a printer is caused by the fact that the frame height of the 35 mm. film is 16 mm. while the distance between frame centers is 19 mm. On 16 mm. film the frame height as well as the distance between frame centers is 7.62 mm. In order to provide an area for picture information which will be as large as is possible frame lines between consecutive frames of 16 mm. film are omitted. The dimensions on 35 mm. film desirably is changed in order that a sound track may be added, thus leaving a separation of approximately 3 mm. between consecutive frames.

In designing a continuous reduction printer the following difficulty is encountered:

Reduction due to frame size: 2.1:1 (16 mm.:10 mm.)
Reduction due to film travel: 2.5:1 (19 mm.:10 mm.)

This difference made it impossible to design by known techniques a continuous reduction printer which would make full use of the available film area at the 16 mm. film. An object of the present invention is to provide means to make reduction prints in a "continuous" manner in which full use can be made of the entire image area of the 16 mm. or smaller positive print film.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawing, in which.

Figure 1:
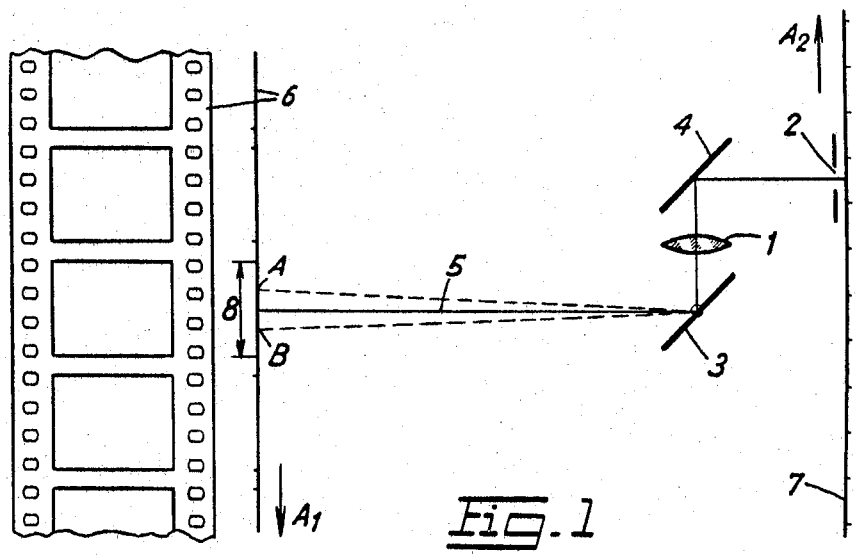
FIG. 1 shows schematically a cross section through a printer of the present invention having a deviated light path, with the left side section of this figure also showing a face view of a section of the projected or negative film.
Figure 3:
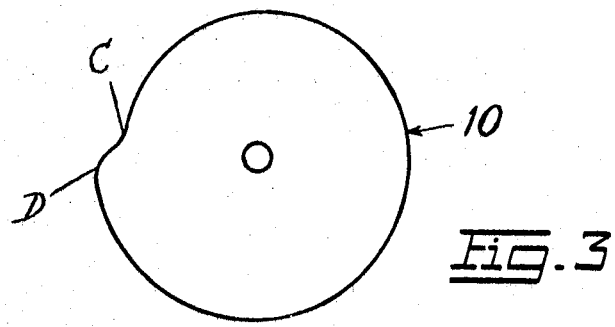
FIG. 3 shows a cam of the present printer with a slow linear rise and a fast drop.

As shown in FIG. 1 the 35 mm. film 6 is moved through the printer of the present invention downwards as indicated by arrow $A_1$, and on the other side the 16 mm. film 7 is moved in the opposite direction of arrow $A_2$. Both films are moved with constant speed, the speed ratio being 2.5:1. Printing lens 1 of the present printer projects an image of the portion of the 35 mm. negative, which can be seen through the printing slot or aperture 8, onto the 16 mm. film through slot or aperture 2. Mirrors 3 and 4 deviate or turn the light path as is indicated in FIG. 1. Since there are two deviating reflections the mechanical distance between film 6 and film 7 can be made shorter, making the printer more compact. Focal length and position of the printing lens 1 is such that film 6 is printed onto film 7 with a reduction of 1:2.1. Since the present printer translates the 35 mm. film 6 at a linear speed of 2.5 times the linear speed at which the 16 mm. film 7 is translated thereby the mirror 3 is mounted rotatably to be swung in paced relation thereto and its position or orientation is controlled and dictated by a cam 10 of the shape indicated in FIG. 3, so that the bundle of rays coming from or projected through the 35 mm. film 6 can follow this film to compensate for the differences in linear speed. At the moment a full frame of film 6 has been printed, that is when the principal ray 5 or optical axis of the beam projected through this negative film of FIG. 1 followed the moving film 6 to point B and the frame line is in the printing slot 8, this principal ray 5 jumps back to point A and picks up the start of the next frame and follows the moving film slowly to point B to complete the second cycle, and so on for successive repetition. It is to be understood that the cam 10 of FIG. 3 is connected to the film drive means (not shown, and which may be of any of many conventional forms suitable for such operation) in a fixed ratio, that is, to move in one full rotation of the cam the 35 mm. film and the 16 mm. film respectively four and one perforation holes. One frame of the 35 mm. negative film 6 is translated by the film drive when this film is driven in the direction of arrow $A_1$ through four sprocket driving edge perforations and their intervening spacings, and one frame of the 16 mm. positive film is translated by this drive in the direction of arrow $A_2$ through one such driving perforation and the spacing to its next succeeding perforation.

As is shown in FIG. 3 the cam, of the disk type, has a first portion C–D constituting a major portion of its outer edge laid out on a curve having a slow linear rise to let the beam axis or principal ray 5 follow the film 6 slowly from point A to point B and a second edge portion D–C with a fast drop to let this beam axis or principal ray return rapidly to point A to begin a new cycle, while the frame line is passing through the printing slot, thus eliminating the frame line from the 16 mm. positive film copy.

Figure 2:
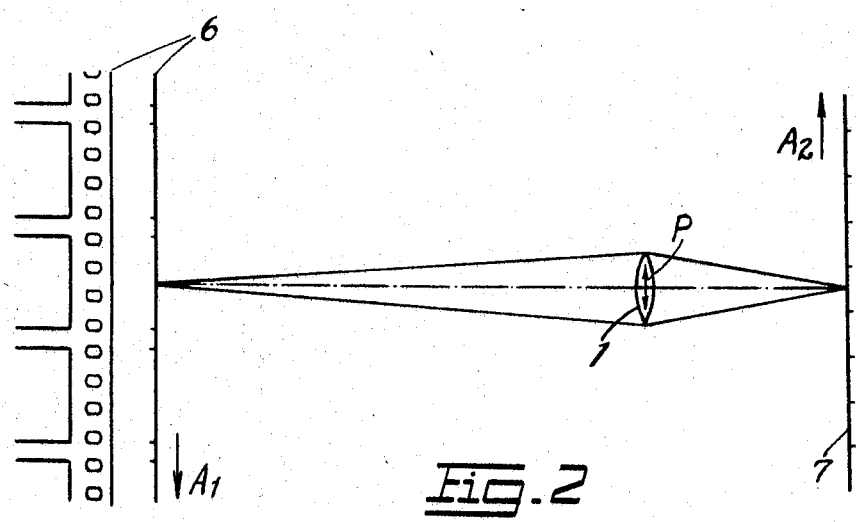
FIG. 2 shows schematically a cross section through a printer having a straight line light path, with the left side section of this figure showing a portion of a face view of a section of the projected or negative film.

Instead of moving or swinging mirror 3 it is possible to shift by any suitable means the lens 1 in FIG. 2 in the direction of the double headed arrow P so that the beam axis or principal ray 5 can follow the linear motion of the negative film 6 as described above.

It is important that the imaging bundle of light rays or projecting beam follow slowly the linear motion of the 35 mm. film 6. At the end of the translation of each frame of film 6 the bundle of light rays or projecting beam jumps back to the beginning of the next frame thereby omitting printing of the frame line.

The film channels, especially that of the 35 mm. film 6 may be curved with the center of curvature being placed in the center of rotation of mirror 3. In the case of an arrangement as in FIG. 2 the film channels are preferably straight.

It should be mentioned that this printing device can also be used reversely to print from 16 mm. negative film onto 35 mm. positive film, and that the larger film is not limited to 35 mm. film and the smaller film need not be limited to 16 mm. in order to permit effective practice of the present invention therewith.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Film printing apparatus for transfer of images from successive frames of a negative film to successive frames of an unexposed positive film with variations comprising,
   (a) means to translate such negative film in one direction along a film path at predetermined linear speed transversely across a first gate opening backed by a fixed-position projecting light source, said gate opening having a longitudinal dimension extending substantially parallel to the transverse dimension of said negative film, and a transverse gate dimension extending substantially parallel to the longitudinal dimension of said negative film and in the direction of the path of translation of the latter;
   (b) means reversely to translate such an unexposed positive film transversely across a second gate opening spaced from and optically opposed to the first gate opening at a predetermined linear speed bearing a certain predetermined relation to the first-mentioned linear speed, said second gate opening having its longitudinal dimension arranged substantially parallel to that of said first gate opening and substantially parallel to the transverse dimension of said positive film with its transverse dimension extending substantially parallel to the longitudinal dimension of said positive film and in the direction of the path of translation of the latter;
   (c) means defining an optical beam transmitting path extending between the gate openings comprising as an optical element thereof a projecting objective lens, said film translating means effecting translations of said negative and positive films in opposite directions relative to said optical beam path and said gate openings; and
   (d) means progressively to move an optical element of said means defining the optical beam path in paced relation to the translation of each frame of said negative film for progressive deviation of the path relative to the transverse dimension of one of the gate openings and in the direction of film travel transversely across this gate opening from the approach side of the latter toward the trailing side thereof whereby each forwardly-traveling, frame-borne image of said negative film is progressively printed in a frame area of said positive film, and to return reversely said optical element rapidly to its initial position substantial as the leading end of the next succeeding frame of said negative film is started transversely across the first gate opening from the approach side of the latter for repeat printing of this next succeeding negative film frame in the immediately following frame area of the positive film without space intervening these positive film frame areas to omit printing any space intervening the image bearing frames of said negative film.

2. The film printing apparatus defined in claim 1 in which said means defining the optical beam path also includes a rotatable mirror as the progressively movable optical element, said means progressively to move said rotatable mirror being means progressively to swing it forward in one direction from an initial position to a position of maximum forward swing and then quickly to swing it back in the opposite direction to its initial position about an axis substantially parallel to the longitudinal dimensions of said gate openings.

3. The film printing apparatus defined in claim 2 in which said means progressively to swing said mirror from its initial position to its position of maximum forward swing and then quickly to swing it back, returns said mirror to its initial position from its position of maximum forward swing during the time each of transverse spaces intervening succeeding frames of said negative film is translated across the first gate opening said mirror being rotatably mounted about a pivot axis extending substantially parallel to the longitudinal dimensions of said gate openings.

4. The film printing apparatus defined in claim 3 in which said means progressively to rotate said mirror in one direction and then quickly to return it to its initial position is a stepped cam rotated in paced relation with said means for translating said negative film across the first gate opening, said stepped cam having a lobe which is gradually spiraled radially outward from an initial radially inward end to a terminal radially outward end to dictate the progressive swing of said mirror from its initial position to its position of maximum forward swing, the rate of drive of said cam being so related to the speed of linear translation of said negative film whereby the initial inward end of said cam lobe begins dictating forward swing of said mirror from its initial position as the leading end of each negative film frame arrives at the approach side of said first gate opening and the terminal outward end of said cam lobe ceases dictating said forward swing as the trailing end of this negative film frame arrives at the approach side of said first gate opening, said cam having a generally radially inwardly extending step extending from the terminal outward end of said lobe to a radially inward point where initial position of said mirror is dictated whereby said step dictates said quick return of said mirror.

5. The film printing apparatus defined in claim 1 in which said progressively movable optical element is said objective lens, said means for progressively moving said lens being means to move it transversely in one direction perpendicular to the optical axis and substantially parallel to the path of translation of said negative film, and then quickly to return it along the same transverse path in the opposite direction to its initial position.

6. The film printing apparatus defined in claim 1 in which the negative film is a 35 mm. film having transverse spaces intervening successive image frames thereof and said positive film is a 16 mm. unexposed film on which successive image frames are to be printed without intervening spaces, the means for moving said optical element effects its return to its initial position while each of the transverse spaces intervening the succeeding frames is translated across the first gate opening to eliminate printing on the 16 mm. film the transverse spaces intervening the succeeding image frames.

References Cited by the Examiner
UNITED STATES PATENTS

| | | | |
|---|---|---|---|
| 1,801,450 | 4/1931 | Owens | 88—24 |
| 3,051,044 | 8/1962 | McNaney | 88—24 |
| 3,062,095 | 11/1962 | Rutkus et al. | 88—24 |

NORTON ANSHER, *Primary Examiner.*
R. A. WINTERCORN, *Assistant Examiner.*